(12) United States Patent
Roth

(10) Patent No.: US 9,205,908 B2
(45) Date of Patent: Dec. 8, 2015

(54) LOCKING MECHANISM FOR USE IN A DECOMPRESSION ARRANGEMENT

(75) Inventor: Ingo Roth, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 268 days.

(21) Appl. No.: 13/435,013

(22) Filed: Mar. 30, 2012

(65) Prior Publication Data

US 2013/0075525 A1     Mar. 28, 2013

Related U.S. Application Data

(60) Provisional application No. 61/469,859, filed on Mar. 31, 2011.

(30) Foreign Application Priority Data

Mar. 31, 2011  (DE) .................. 10 2011 015 708

(51) Int. Cl.
| | |
|---|---|
| *B64C 1/10* | (2006.01) |
| *B64C 1/18* | (2006.01) |
| *B64C 1/00* | (2006.01) |

(52) U.S. Cl.
CPC ... *B64C 1/10* (2013.01); *B64C 1/18* (2013.01); *B64C 2001/009* (2013.01)

(58) Field of Classification Search
CPC ... E05B 51/023; B64C 2001/009; B64C 1/10; B64C 1/18
USPC ..................................................... 244/118.5
See application file for complete search history.

(56) References Cited

U.S. PATENT DOCUMENTS

| 4,033,247 | A | * | 7/1977 | Murphy .......................... 454/76 |
|---|---|---|---|---|
| 4,383,666 | A | * | 5/1983 | Allerding et al. .......... 244/118.5 |
| 4,390,152 | A | * | 6/1983 | Jorgensen .................. 244/118.5 |
| 4,432,514 | A | * | 2/1984 | Brandon .................... 244/118.5 |
| 4,646,993 | A | * | 3/1987 | Baetke ...................... 244/117 R |
| RE32,554 | E | * | 12/1987 | Murphy ..................... 244/118.5 |

(Continued)

FOREIGN PATENT DOCUMENTS

| DE | 102004009017 B3 | 8/2005 |
|---|---|---|
| EP | 1 186 531 A1 | 3/2002 |
| EP | 1921006 A2 | 5/2008 |

OTHER PUBLICATIONS

German Office Action issued in corresponding application No. 10 2011 015 708.5 dated Mar. 12, 2013.

*Primary Examiner* — Philip J Bonzell
*Assistant Examiner* — Michael Kreiner
(74) *Attorney, Agent, or Firm* — Carter, DeLuca, Farrell & Schmidt, LLP

(57) ABSTRACT

A locking mechanism, in particular suitable for use in a decompression arrangement, includes a pressure chamber surrounded by a delimiting wall, wherein at least a section of the pressure chamber delimiting wall is formed by an actuating element which is in a rest position when the pressure in the interior of the pressure chamber corresponds to the ambient pressure and moves into a differential pressure position when the pressure in the interior of the pressure chamber exceeds the ambient pressure by a predetermined differential value. The locking mechanism further includes a locking bar which is kept in a locked position when the actuating element is in its rest position and is movable into an unlocked position when the actuating element is in its differential pressure position.

10 Claims, 2 Drawing Sheets

(56) References Cited

U.S. PATENT DOCUMENTS

| | | | |
|---|---|---|---|
| 4,899,960 A | 2/1990 | Hararat-Tehrani et al. | |
| 5,118,053 A * | 6/1992 | Singh et al. | 244/118.5 |
| 5,871,178 A | 2/1999 | Barnett et al. | |
| 6,651,932 B2 | 11/2003 | Diehl et al. | |
| 8,393,577 B2 * | 3/2013 | Roth et al. | 244/129.5 |
| 8,459,701 B2 * | 6/2013 | Szarszewski | 292/21 |
| 2010/0193637 A1 | 8/2010 | Szarszewski | |

\* cited by examiner

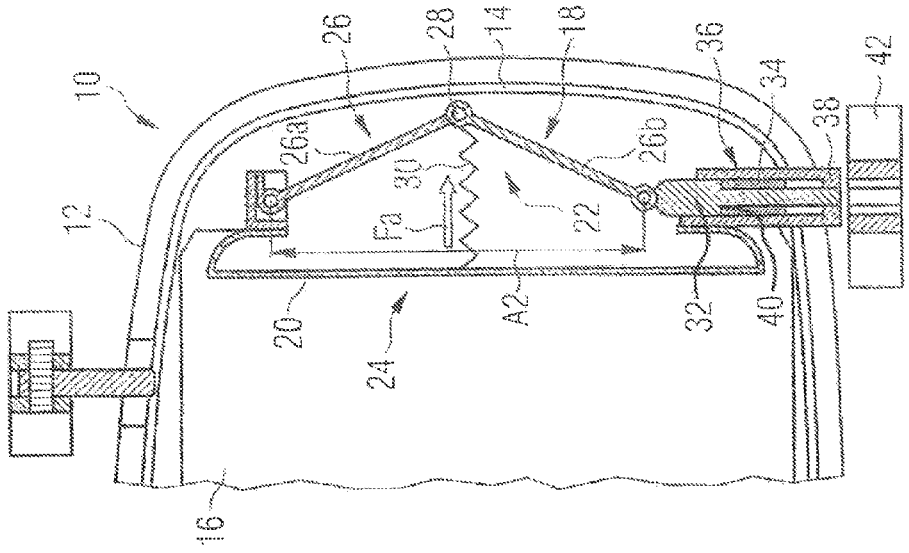
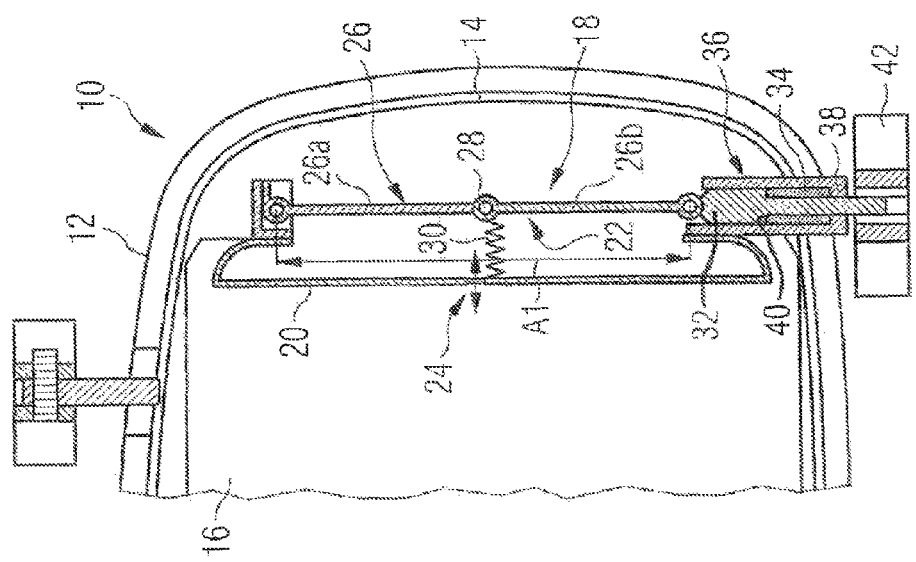

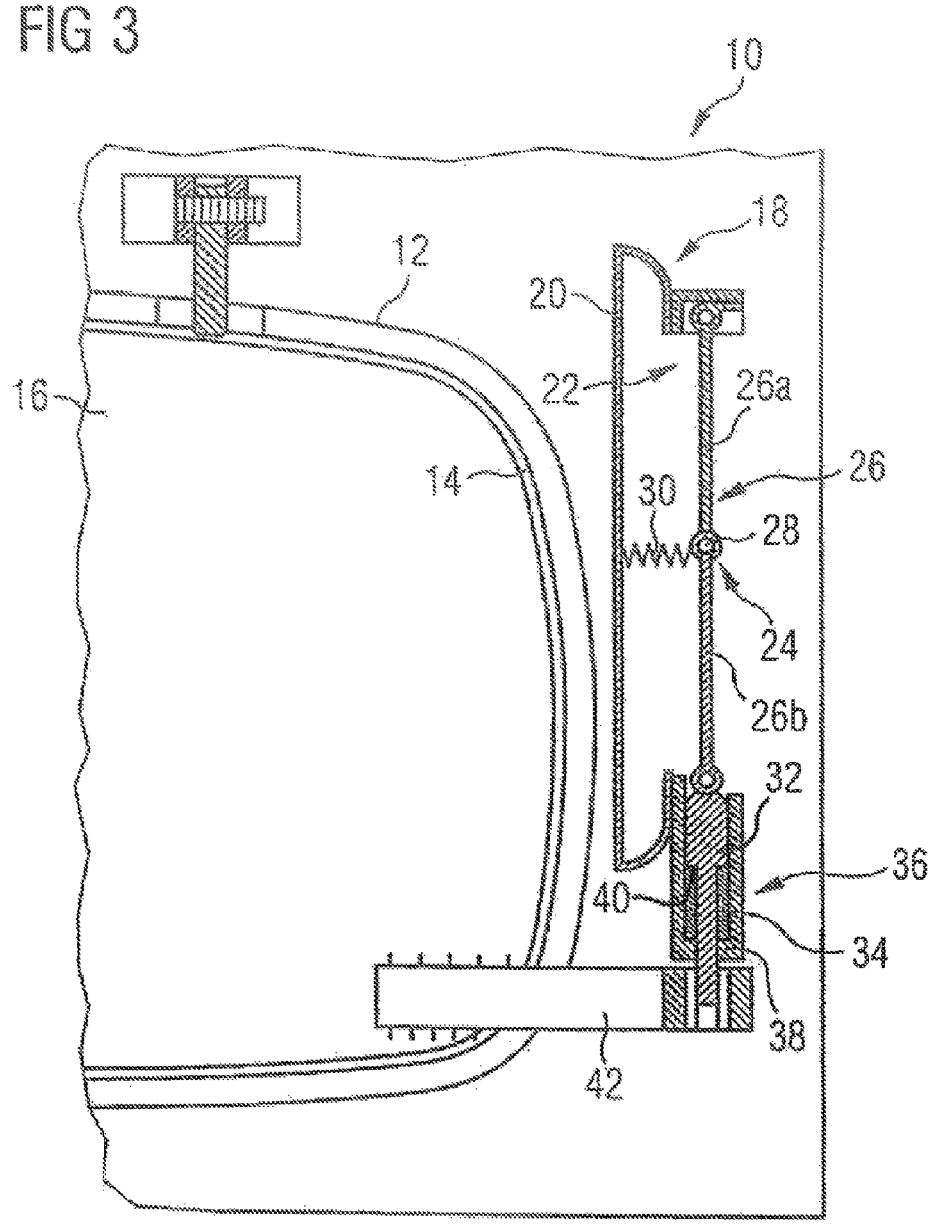

LOCKING MECHANISM FOR USE IN A DECOMPRESSION ARRANGEMENT

TECHNICAL FIELD

The invention relates to a locking mechanism suitable for use in a decompression arrangement, and to a decompression arrangement which is equipped with a locking mechanism of this kind and is in particular for use in an aircraft.

BACKGROUND

Commercial aircraft include a pressurised cabin whereof the internal pressure during flight is kept at a level higher than ambient pressure, that is to say the reduced atmospheric pressure at high altitudes, for example by an air conditioning system fed with air from the bleed air system. In general, the pressure inside the cabin of a commercial aircraft during flight, that is to say when the aircraft is at cruising altitude, conventionally corresponds approximately to ambient pressure at an altitude of 8000 feet (approximately 2400 m). Conventionally, an aircraft pressurised cabin includes a plurality of regions separated from one another by appropriate partition walls and/or intermediate floors, such as the cockpit, passenger cabin, crew rest compartments or freight compartments.

In order in the event of decompression, that is to say in the event of a drop in pressure in a region of the aircraft cabin that is kept at elevated pressure during flight, to avoid damage to the partition walls and/or intermediate floors that separate the region of the aircraft cabin that is affected by decompression from the regions of the aircraft cabin surrounding this region, it must be possible in the event of decompression to equalise the pressure between the region of the aircraft cabin that is affected by decompression and the regions of the aircraft cabin surrounding this region. For this reason, conventionally so-called decompression elements are provided in partition walls and/or intermediate floors serving to separate from one another different regions of an aircraft cabin which is kept at elevated pressure by comparison with ambient pressure.

These decompression elements are integrated in the partition walls and/or intermediate floors provided in the aircraft cabin such that, when there is a predetermined difference in pressure between the mutually adjoining regions of the aircraft cabin which are separated from one another by the partition walls and/or intermediate floors, they are released from their position and open a pressure equalisation opening. The pressure equalisation opening then makes it possible to equalise the pressure between the mutually adjoining regions of the aircraft cabin which are separated from one another by the partition walls and/or intermediate floors.

According to the prior art, such as DE 37 015 328 C1, devices for releasably securing a decompression element in a partition wall provided for use in an aircraft cabin are provided in which a holding element is constructed to break when a predetermined differential pressure acts on the decompression element. Once the holding element has broken, the decompression element is released from its position, as a result of the differential pressure acting on the decompression element, and opens a pressure equalisation opening in the partition wall.

By contrast, U.S. Pat. No. 5,871,178 and EP 1 186 531 A1 disclose devices for releasably securing a decompression element in a partition wall provided for use in an aircraft cabin, these devices each including holding elements which keep the decompression element in its position in the partition wall by means of a spring or clamping force. When a predetermined differential pressure acts on the decompression element, the pressure acting on the panel exceeds the spring or clamping force applied by the holding elements, with the result that the decompression element is released from its position in the partition wall and opens a pressure equalisation opening in the partition wall.

Finally, there is known from DE 10 2007 027 550 A1 a locking mechanism which is controlled by differential pressure and which has a housing in which a first and a second pressure chamber are arranged. The first and the second pressure chamber are separated from one another by a movable partition means. When the pressure in the first pressure chamber is equal to the pressure in the second pressure chamber, that is to say when there is no differential pressure acting on the partition means, the partition means is in a rest position. By contrast, when a predetermined differential pressure acts on the partition means, the partition means is movable out of its rest position into a differential pressure position. The locking mechanism furthermore includes an actuating element which is kept in a first position by the partition means when the partition means is in its rest position. By contrast, when the partition means is in a differential pressure position, the actuating element is movable into a second position.

SUMMARY

An object of the present invention is to provide a compact locking mechanism which is suitable for releasably securing decompression elements of different shape and size in a partition wall or an intermediate floor of an aircraft cabin. A further object of the invention is to provide a decompression arrangement equipped with a locking mechanism of this kind.

This object is achieved by a locking mechanism having the features specified in claim 1, and by a decompression arrangement having the features specified in claim 9.

The locking mechanism according to the invention includes a pressure chamber surrounded by a delimiting wall. An interior of the pressure chamber may be connected to the ambient environment by way of an opening formed in the pressure chamber delimiting wall. Preferably, the opening formed in the pressure chamber delimiting wall makes it possible to perform a stationary equalisation of pressure between the interior of the pressure chamber and the ambient environment. Preferably, however, the opening is small enough for the pressure not to be equalised directly but for a sudden drop in pressure in the ambient environment (rapid decompression) to produce first a difference in pressure between the ambient environment and the pressure chamber, that is to say that a higher pressure prevails in the pressure chamber than in the ambient environment.

At least a section of the pressure chamber delimiting wall is formed by an actuating element which is in a rest position when the pressure in the interior of the pressure chamber corresponds to the ambient pressure and moves into a differential pressure position when the pressure in the interior of the pressure chamber exceeds the ambient pressure by a predetermined differential value. The actuating element is in particular integrated into the pressure chamber delimiting wall such that a pressure prevailing in the pressure chamber acts on an inner face of the actuating element. By contrast, the ambient pressure may act on an outer face of the actuating element. When the pressure in the interior of the pressure chamber exceeds the ambient pressure by the predetermined differential value of, for example, 30 hPa, the actuating element is moved into its differential pressure position as a result of the pressure difference.

Finally, the locking mechanism includes a locking bar which is kept in a locked position when the actuating element is in its rest position and is movable into an unlocked position when the actuating element is in its differential pressure position. Moving the actuating element into its differential pressure position thus makes it possible to move the locking bar out of its locked position and into its unlocked position. Consequently, the locking bar can only be put in its unlocked position when the pressure in the interior of the pressure chamber exceeds the ambient pressure by the predetermined differential pressure.

The locking mechanism according to the invention advantageously takes the form of a module which is independently operable and may in principle be used for any applications in which a locking bar is to be moved out of a locked position into an unlocked position when a pressure in the interior of a pressure chamber of the locking mechanism exceeds the ambient pressure by a predetermined amount. The locking mechanism is of compact construction and is easy to install. Because of this, the locking mechanism according to the invention is particularly well suited to releasably securing a decompression element of any shape and size in a partition wall or an intermediate floor of an aircraft cabin.

Depending on the shape and size of the decompression element, it is possible for only one locking mechanism according to the invention or a plurality of locking mechanisms, mounted at different positions on the decompression element, to be used for releasably securing the decompression element in the partition wall or intermediate floor of the aircraft cabin. For this reason, the locking mechanism according to the invention is particularly flexible to use. Furthermore, the number of locking mechanisms and the arrangement thereof may be optimised to the weight of the overall system, with the result that a reduction in weight by comparison with known systems is even possible in some circumstances. Finally, the locking mechanism according to the invention is distinguished by a high level of operational reliability, because of its purely mechanical mode of functioning.

Preferably, the actuating element includes a first section and a second section which is connected in articulated manner to the first section. The first and the second section of the actuating element may each take the form of a rod or plate. Preferably, the first and the second section of the actuating element both have the same shape, with the result that an articulation connecting the first to the second section may be positioned in the region of a centre line of a surface defined by the first and the second section of the actuating element. An end of the first section which faces away from the second section is preferably supported in articulated manner. In addition or as an alternative thereto, it is also possible for an end of the second section of the actuating element which faces away from the first section to be supported in articulated manner. Preferably, the end of the first section which faces away from the second section is at the same distance from the articulation connecting the first to the second section as the end of the second section which faces away from the first section.

The first and the second section of the actuating element preferably form an angle of approximately 180° when the actuating element is in its rest position. In other words, when the actuating element is in its rest position the first and the second section of the actuating element preferably lie in a plane, with a first spacing between the end of the first section which faces away from the second section and the end of the second section which faces away from the first section. When the actuating element is in its differential pressure position, by contrast, the first and the second section of the actuating element are preferably inclined in relation to one another and form for example an angle of approximately 90 to 170°. Between the end of the first section which faces away from the second section and the end of the second section which faces away from the first section there is then a second spacing which is smaller than the first spacing.

The end of the second section of the actuating element which faces away from the first section is preferably connected to the locking bar in articulated manner. This has the effect that while the actuating element is in its rest position it can exert a force on the locking bar which keeps the locking bar in its locked position. By contrast, when the actuating element is in its differential pressure position, the end of the second section of the actuating element which faces away from the first section no longer presses on the locking bar, as a result of which the locking bar can be moved into its unlocked position.

The actuating element may be pre-tensioned into its rest position by the force of a first spring. Here, the first spring is preferably constructed such that it keeps the actuating element in its rest position while a pressure difference between the interior of the pressure chamber and the ambient environment remains below a predetermined amount, that is to say that the differential pressure acting on the actuating element is smaller than a predetermined differential presto sure. This reliably prevents the actuating element from moving, in the event of slight fluctuations in the pressure in the interior of the pressure chamber or the ambient environment, out of its rest position and into its differential pressure position, in which it makes it possible for the locking bar to move into its unlocked position. Preferably, the construction of the first spring is such that the pre-tensioning force it applies to the actuating element is a function of the desired predetermined differential pressure required to move the actuating element out of its rest position and into its differential pressure position. In this way, an appropriate construction of the first spring is able to control the trigger behaviour of the locking mechanism according to the invention in a simple manner.

A first end of the first spring that pre-tensions the actuating element into its rest position may be supported on the articulation that connects the first and the second section of the actuating element. This enables the spring force to be transmitted to the actuating element in optimum manner. By contrast, a second end of the first spring opposite to the first end may be supported in a region of the pressure chamber delimiting wall that lies opposite the articulation.

The locking bar may be pre-tensioned into its unlocked position by the force of a second spring. In this case the actuating element presses the locking bar into its locked position, in opposition to the force of the second spring, while the actuating element is in its rest position. By contrast, when the actuating element moves into its differential pressure position and releases the locking bar, the second spring presses the locking bar into its unlocked position. This ensures that the locking bar is unlocked quickly when the pressure in the interior of the pressure chamber exceeds the ambient pressure by the predetermined differential value.

The locking bar may be displaceable, guided in a guide means, between its locked position and its unlocked position. For example, the locking bar may take the form of a bolt and the guide means may take the form of a guide sleeve receiving the bolt. The second spring, which pre-tensions the locking bar in its unlocking position, may in particular be supported on the guide means which receives the locking bar.

A decompression arrangement according to the invention includes a partition device which is adapted to separate from one another two regions of the ambient environment. The partition device may for example be a partition wall or an intermediate floor which separates mutually adjoining regions of an aircraft cabin from one another. There is formed in the partition device a pressure equalisation opening which, in the event of a sudden drop in pressure in one of the two mutually adjoining regions of the aircraft cabin, makes it possible to equalise the pressure between the regions of the aircraft cabin. A decompression element is adapted to close the pressure equalisation opening in the partition device when the decompression arrangement is in normal operation. In the event of decompression, by contrast, the decompression element opens the pressure equalisation opening formed in the partition device. At least one locking mechanism as described above keeps the decompression element in a closed position in which it closes the pressure equalisation opening formed in the partition device. Depending on the shape and size of the decompression element, the decompression element may also be kept in its closed position by a plurality of locking mechanisms.

The locking mechanism may be mounted on the decompression element, and the locking bar of the locking mechanism may, in its locked position, interact with a locking bar receiver secured to the partition device. As an alternative to this, however, it is possible to mount the locking mechanism on the partition device. The locking bar of the locking mechanism may then interact, in its locked position, with a locking bar receiver secured to the decompression element.

A decompression arrangement as described above is particularly well suited for use in an aircraft cabin.

BRIEF DESCRIPTION OF THE DRAWINGS

Preferred embodiments of the invention will now be described in more detail with reference to the attached schematic drawings, of which:

FIG. 1 shows a first embodiment of a decompression arrangement having a locking mechanism, with the locking mechanism in a locked condition, FIG. 2 shows the decompression arrangement from FIG. 1, with the locking mechanism in an unlocked condition, and FIG. 3 shows a second embodiment of a decompression arrangement having a locking is mechanism, with the locking mechanism in a locked condition.

DETAILED DESCRIPTION

A decompression arrangement 10 which is shown in FIGS. 1 and 2 includes a partition device 12, for example a partition wall or an intermediate floor, which separates two mutually adjoining regions of an aircraft cabin from one another. There is formed in the partition device 12 a pressure equalisation opening 14 which, in the event of a sudden drop in pressure in one of the two mutually adjoining regions of the aircraft cabin, makes it possible to equalise the pressure between the regions of the aircraft cabin. A decompression element 16 closes the pressure equalisation opening 14 in the partition device 12 when the decompression arrangement 10 is in normal operation.

The decompression element 16 is kept in its closed position by a locking mechanism 18 which will be described in more detail below. The locking mechanism 18 secured to the decompression element 16 includes a pressure chamber 22 surrounded by a delimiting wall 20. An opening 24 formed in the pressure chamber delimiting wall 20 makes it possible to perform a stationary equalisation of pressure between the interior of the pressure chamber 22 and the ambient environment. However, the cross section of flow of the opening 24 is small enough for the pressure not to be equalised directly but for a sudden drop in pressure in the ambient environment (rapid decompression) to produce first a difference in pressure between the ambient environment and the pressure chamber 22, that is to say for a higher pressure to prevail in the pressure chamber 22 than in the ambient environment.

An actuating element 26 forms a section, shown on the right in the figures, of the pressure chamber delimiting wall 20. The actuating element 26 is integrated into the pressure chamber delimiting wall 20 such that a pressure prevailing in the pressure chamber 22 acts on an inner face of the actuating element 26. By contrast, the ambient pressure acts on an outer face of the actuating element 26. The actuating element 26 includes a first section 26a and a second section 26b which is connected in articulated manner to the first section 26a. The first and the second section 26a, 26b of the actuating element 26 each take the form of a narrow plate. An articulation 28 connecting the first section 26a to the second section 26b is positioned in the region of a centre line of a surface defined by the first and the second section 26a, 26b of the actuating element 26. Furthermore, an end of the first section 26a of the actuating element 26 which faces away from the second section 26b is supported in articulated manner in just the same way as an end of the second section 26b of the actuating element 26 which faces away from the first section 26a.

The actuating element 26 is kept in a rest position, illustrated in FIGS. 1 and 3, by the force of a first spring 30 while the pressure in the interior of the pressure chamber 22 corresponds to the ambient pressure. In this connection, the first spring 30 is adapted such that it keeps the actuating element 26 in its rest position while a pressure difference between the interior of the pressure chamber 22 and the ambient environment remains below a predetermined amount, that is to say that the differential pressure acting on the actuating element is smaller than a predetermined differential pressure of, for example, 30 hPa. A first end of the first spring 30, pre-tensioning the actuating element 26 into its rest position, is supported against the articulation 28 that connects the first and the second section 26a, 26b of the actuating element 26. By contrast, a second end of the first spring 30, opposite the first end, is supported in a region of the pressure chamber delimiting wall 20 opposite the articulation.

The first and the second section 26a, 26b of the actuating element 26 form an angle of approximately 180° when the actuating element 26 is in its rest position, that is to say that the first and the second section 26a, 26b of the actuating element 26 lie in a plane, with a first spacing $A_1$ between the end of the first section 26a which faces away from the second section 26b and the end of the second section 26b which faces away from the first section 26a. The end of the second section 26b of the actuating element 26 which faces away from the first section 26a is connected in articulated manner to a locking bar 32 which takes the form of a bolt. When the actuating element 26 is in its rest position, as shown in FIGS. 1 and 3, the actuating element 26 exerts a force on the locking bar 32 which keeps the locking bar 32 in its locked position, in opposition to the force of a second spring 34.

The locking bar 32 is received in a guide means 36 which takes the form of a guide sleeve. A first end of the second spring 34 is supported against a radially inwardly projecting collar 38 of the guide means 36. By contrast, a second end of the spring 34 is supported against a radially outwardly projecting shoulder 40 of the locking bar 32. In its locked position, shown in FIGS. 1 and 3, the locking bar 32 passes through the guide means 36. An end of the locking bar 32 projecting out of the guide means 36 interacts with a locking bar receiver 42 which is secured to the partition device 12. As a result of the interaction between the locking bar 32 and the locking bar receiver 42, the decompression element 16 is kept in its closed position, in which it closes the pressure equalisation opening 14 in the partition device 12.

If, in the event of a sudden drop in pressure in the ambient environment, the difference between the pressure in the interior of the pressure chamber 22 and the ambient pressure becomes so great that it exceeds a predetermined differential pressure threshold of, for example, 30 hPa, the actuating element 26 is moved in opposition to the force of the first spring 30, into a differential pressure position shown in FIG. 2. When the actuating element 26 is in its differential pressure position, the first and the second section 26a, 26b of the actuating element 26 are inclined in relation to one another and form an angle of approximately 120°. There is then a second spacing $A_2$, smaller than the first spacing $A_1$, between the end of the first section 26a of the actuating element 26 which faces away from the second section 26b and the end of the second section 26b of the actuating element 26 which faces away from the first section 26a.

When the actuating element 26 is in its differential pressure position, the end of the second section 26b of the actuating element 26 which faces away from the first section 26a no longer presses on the locking bar 32. As a result of this, the locking bar 32 can be moved into its unlocked position by the force of the second spring 34. This brings the locking bar 32 and the locking bar receiver 42 out of engagement. The second spring 34 may have a high spring pretension. The second spring 34 can then move the locking bar 32 into its unlocked position very quickly, with the result that rapid triggering of the locking mechanism 18 is ensured.

At this stage the decompression element 16 is no longer kept in its position in the region of the pressure equalisation opening 14 in the partition device 12. Rather, because of the differential pressure acting on the decompression element 16 in the event of decompression, the decompression element 16 is pressed out of its position in the region of the pressure equalisation opening 14 in the partition device 12, as a result of which the pressure equalisation opening 14 is opened and it becomes possible to equalise the pressure between the region of the aircraft cabin affected by decompression and the adjoining region of the aircraft.

The decompression arrangement 10 shown in FIG. 3 only differs from the system illustrated in FIGS. 1 and 2 in that the locking mechanism 18 is not secured to the decompression element 16 but to the partition device 12. With a configuration of the decompression arrangement 10 of this kind, when the locking bar 32 of the locking mechanism 18 is in its locked position it interacts with a locking bar receiver 42 that is connected to the decompression element 16. Otherwise, the structure and mode of operation of the decompression arrangement 10 in FIG. 3 correspond to the structure and mode of operation of the arrangement illustrated in FIGS. 1 and 2.

The invention claimed is:

1. A locking mechanism for use in a decompression arrangement, comprising:
   a pressure chamber surrounded by a delimiting wall, wherein at least a section of the pressure chamber delimiting wall is formed by an actuating element which is in a rest position when the pressure in an interior of the pressure chamber corresponds to ambient pressure and moves into a differential pressure position when the pressure in the interior of the pressure chamber exceeds the ambient pressure by a predetermined differential value; and
   a locking bar which is kept in a locked position when the actuating element is in its rest position and is axially movable in an axial direction of the locking bar from the locked position to an unlocked position when the actuating element is in its differential pressure position;
   wherein the actuating element includes a first section and a second section which is connected in an articulated manner to the first section, and
   wherein at least one of an end of the first section which faces away from the second section and an end of the second section of the actuating element which faces away from the first section is supported in an articulated manner.

2. A locking mechanism according to claim 1, wherein the first and the second section of the actuating element form an angle of approximately 180° when the actuating element is in its rest position, and
   wherein when the actuating element is in its differential pressure position the first and the second section of the actuating element form an angle of approximately 90 to 170°.

3. A locking mechanism according to claim 1, wherein the end of the second section of the actuating element which faces away from the first section is connected to the locking bar in articulated manner.

4. A locking mechanism according to claim 1, wherein the actuating element is pre-tensioned into its rest position by the force of a first spring.

5. A locking mechanism according to claim 4, wherein the first spring that pre-tensions the actuating element into its rest position is supported at one of:
   an articulation that connects the first and the second section of the actuating element; and
   a region of the pressure chamber delimiting wall that lies opposite the articulation that connects the first and the second section of the actuating element.

6. A locking mechanism according to claim 4, wherein the locking bar is pre-tensioned into its unlocked position by the force of a second spring.

7. A locking mechanism according to claim 6, wherein the locking bar is displaceable, guided in a guide means, between its locked position and its unlocked position, wherein the second spring, which pre-tensions the locking bar into its unlocked position, is supported on the guide means which receives the locking bar.

8. A decompression arrangement, comprising:
   a partition device adapted to separate from one another two regions of ambient environment;
   a pressure equalisation opening formed in the partition device; and
   a decompression element adapted to close or to open the pressure equalisation opening formed in the partition device, wherein the decompression element is kept in a closed position by at least one locking mechanism according to claim 1, in which it closes the pressure equalisation opening formed in the partition device.

9. A decompression arrangement according to claim 8, wherein the locking mechanism is mounted on the decompression element, and the locking bar of the locking mechanism, in its locked position, interacts with a locking bar receiver secured to the partition device.

10. A decompression arrangement according to claim 8, wherein the locking mechanism is mounted on the partition device and the locking bar of the locking mechanism interacts, in its locked position, with a locking bar receiver secured to the decompression element.

* * * * *